United States Patent [19]

Kasai et al.

[11] Patent Number: 5,092,814
[45] Date of Patent: Mar. 3, 1992

[54] METHOD AND APPARATUS FOR SUPPLYING CASINGS

[75] Inventors: Minoru Kasai, Ebina; Minoru Nakamura, Tokyo, both of Japan

[73] Assignee: Hitec Co., Ltd., Tokyo, Japan

[21] Appl. No.: 503,846

[22] Filed: Apr. 3, 1990

[30] Foreign Application Priority Data

Apr. 5, 1989 [JP] Japan .................................. 1-84646

[51] Int. Cl.$^5$ ............................................ A22C 11/00
[52] U.S. Cl. ...................................... 452/47; 452/32; 452/35; 53/250
[58] Field of Search .................. 17/33, 34, 35, 41, 49; 53/249, 250, 258, 572

[56] References Cited

U.S. PATENT DOCUMENTS

| | | |
|---|---|---|
| 3,191,222 | 6/1965 | Townsend ............................ 17/33 |
| 3,195,176 | 7/1965 | Washburn ............................ 17/49 |
| 3,229,444 | 1/1966 | Rouse ................................. 53/249 |
| 3,672,001 | 6/1972 | Greider .............................. 17/33 |
| 4,434,527 | 3/1984 | Staudenrausch et al. ............ 17/33 |
| 4,489,460 | 12/1984 | Nausedas ............................ 17/49 |
| 4,545,091 | 10/1985 | Nausedas et al. ................... 17/33 |
| 4,583,264 | 4/1986 | Nausedas ............................ 17/1 F |
| 4,593,433 | 6/1986 | Nausedas ............................ 17/49 |
| 4,649,607 | 3/1987 | Rollross ............................. 17/33 |

OTHER PUBLICATIONS

Prevention Method . . . vol. 12, No. 142 (M-692) Apr. 30, 1988.
Continuous Casting . . . vol. 9, No. 5 (C-260) Jan. 10, 1985.
Continuous Production . . . vol. 10, No. 105 (M-471) Apr. 9, 1986.

Primary Examiner—Frederick R. Schmidt
Assistant Examiner—Lawrence Cruz
Attorney, Agent, or Firm—Wegner, Cantor, Mueller, & Player

[57] ABSTRACT

Disclosed are a method and an apparatus for supplying casings to a stuffing device having a stuffing tube for stuffing a content into a casing. The apparatus includes a supplying member having an arranging surface for arranging thereon a plurality of casings between an upstream portion and a downstream portion and having a restricting portion for preventing the casing to be fitted over the stuffing tube from moving in a downstream direction; and an axis extending at a distance from, and along a longitudinal direction of, the restricting portion. The supplying member is rotatable about the axis between a position in which the casing located at the restricting portion is aligned with the stuffing tube on the one hand, and another position on the other.

23 Claims, 14 Drawing Sheets

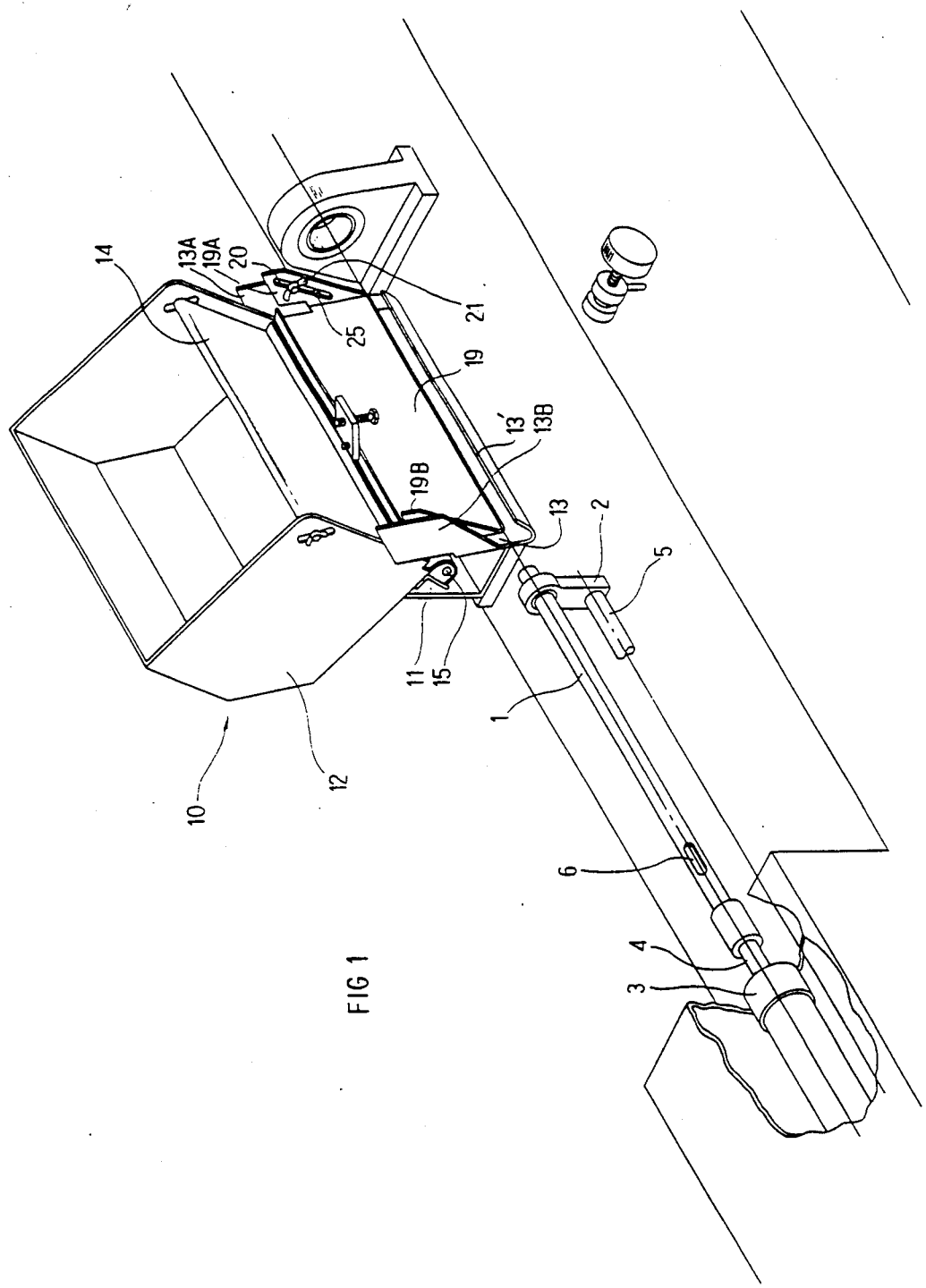

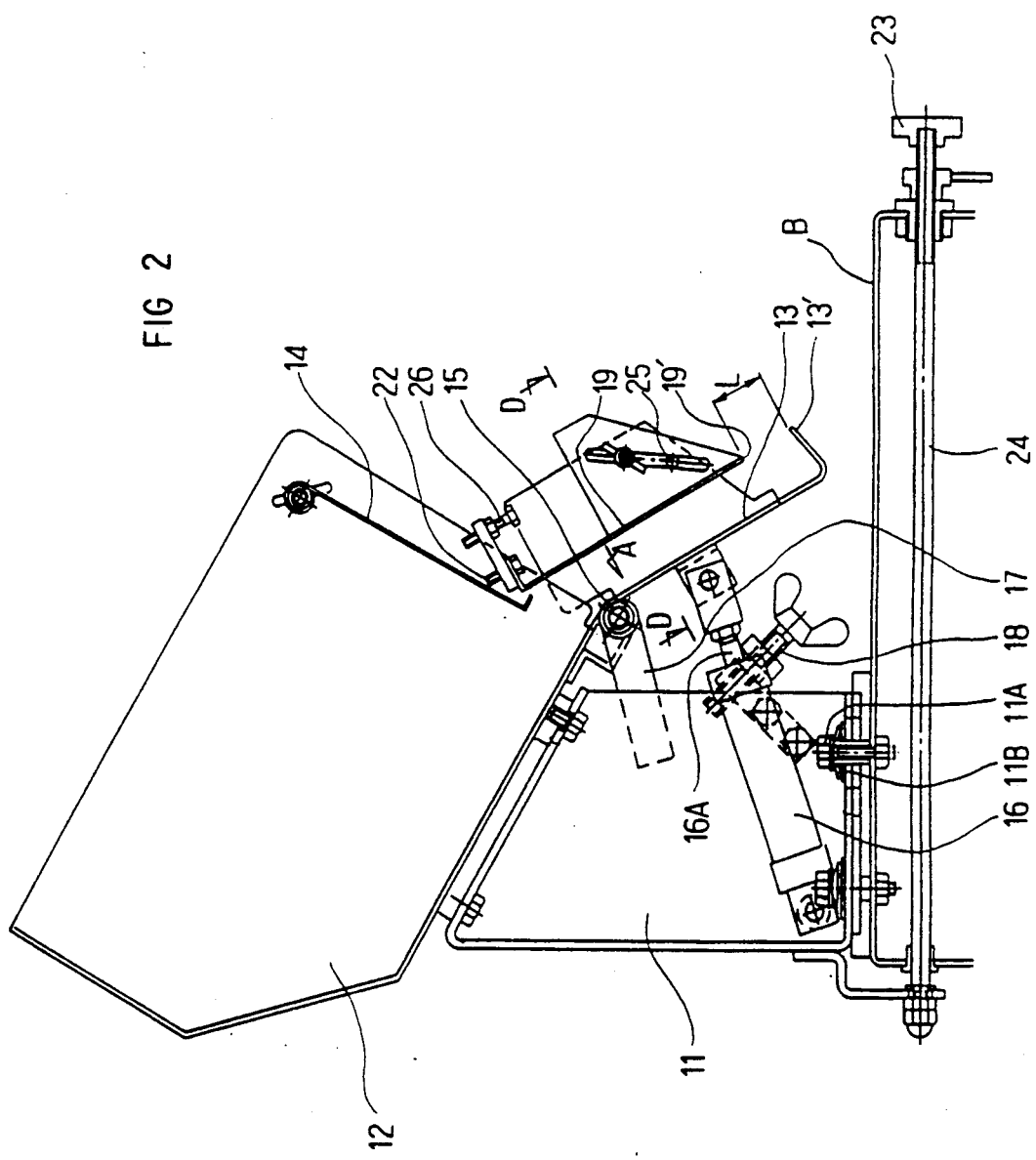

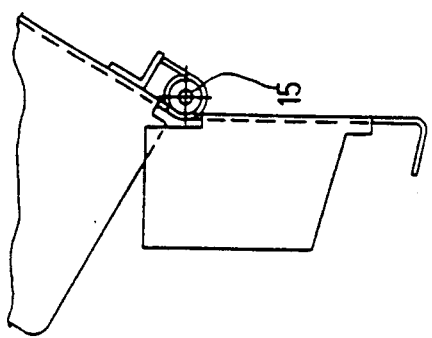
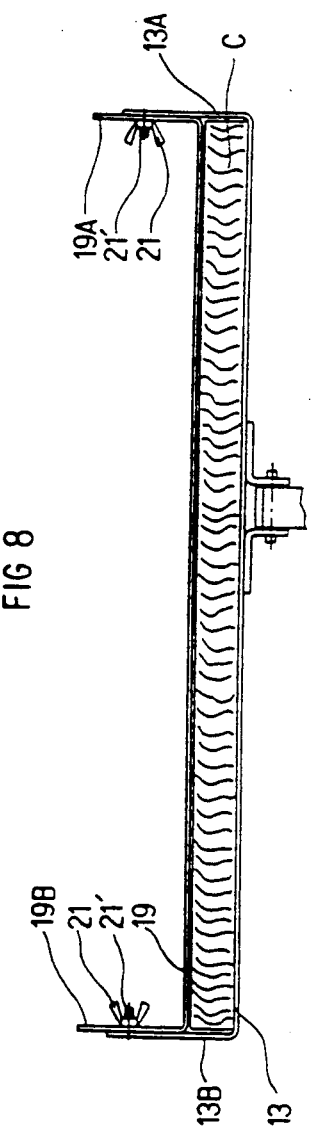
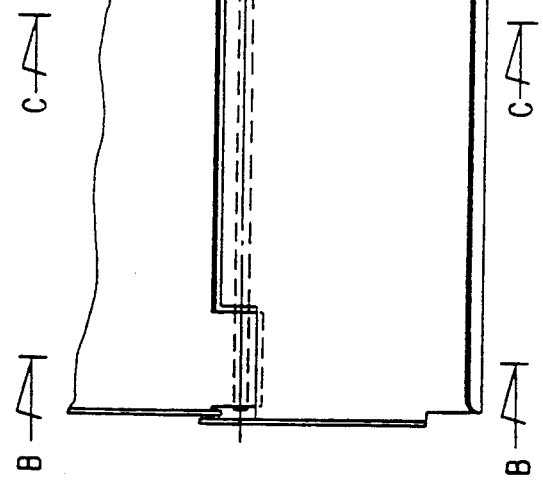
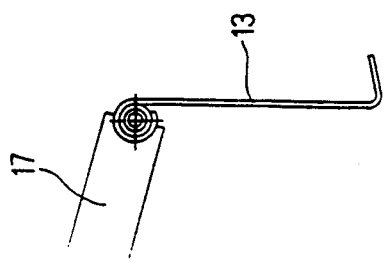

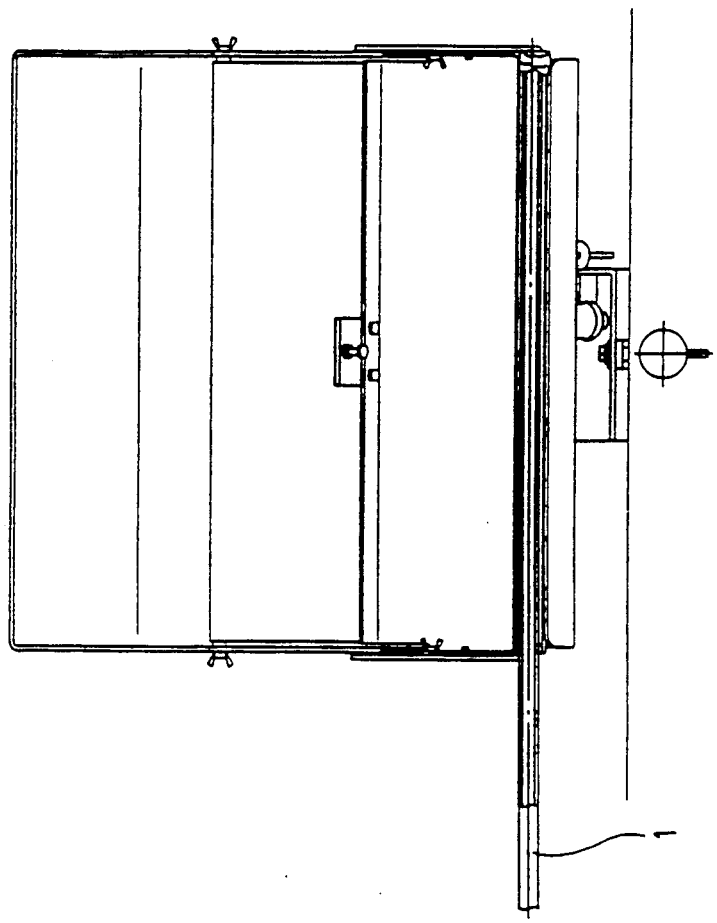
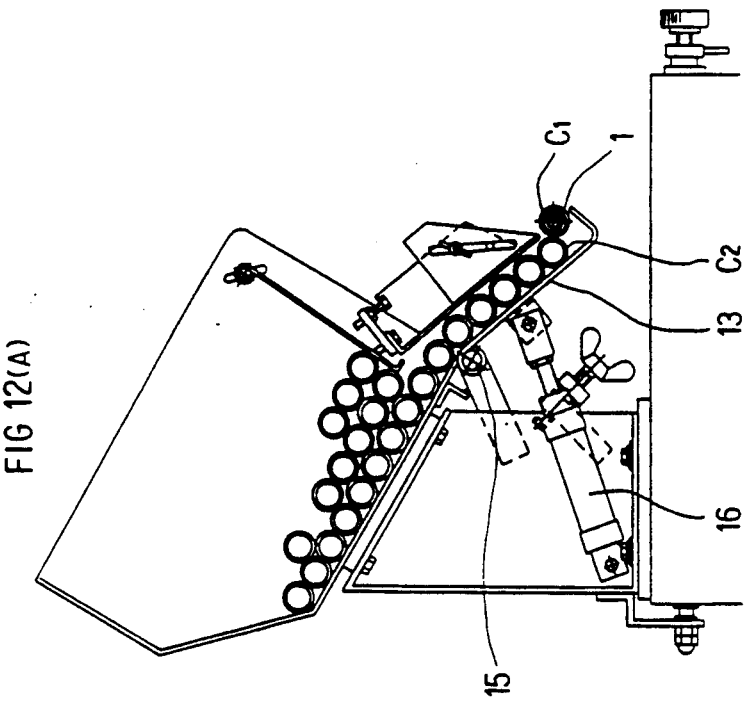

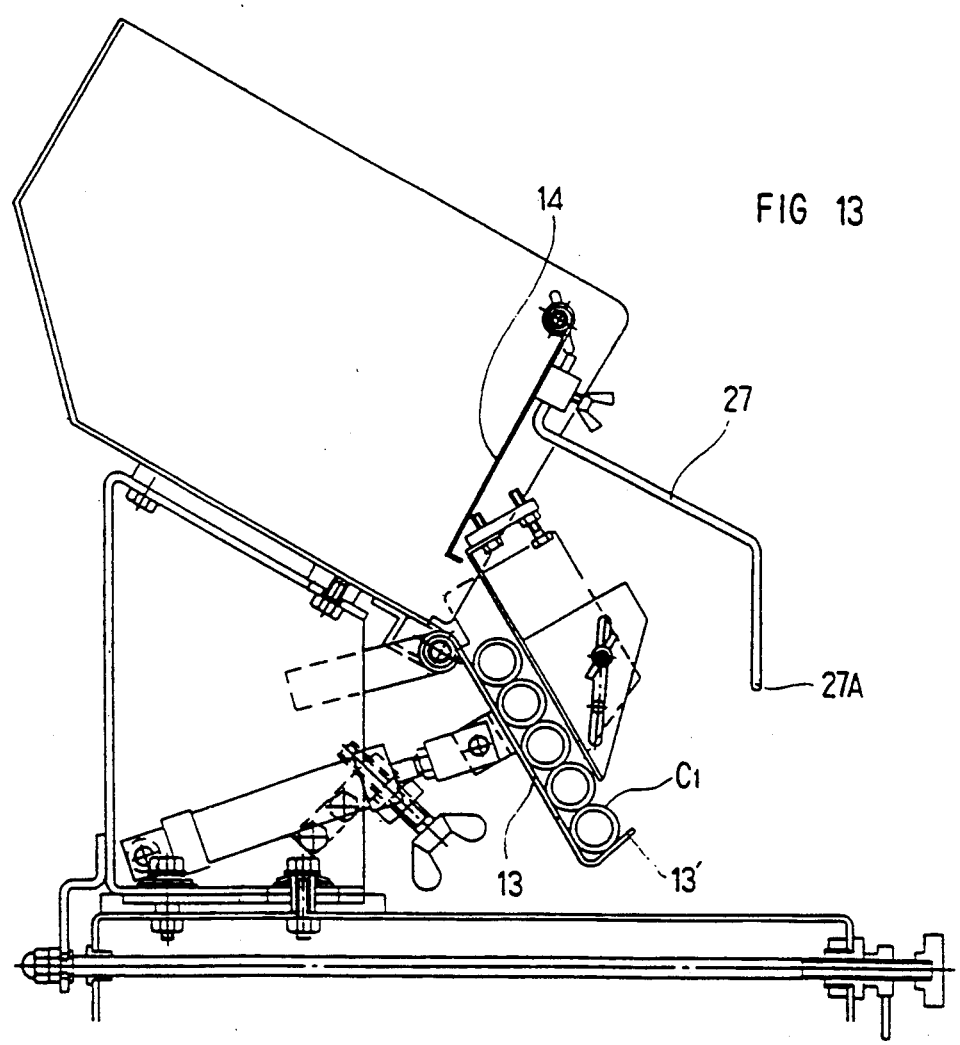

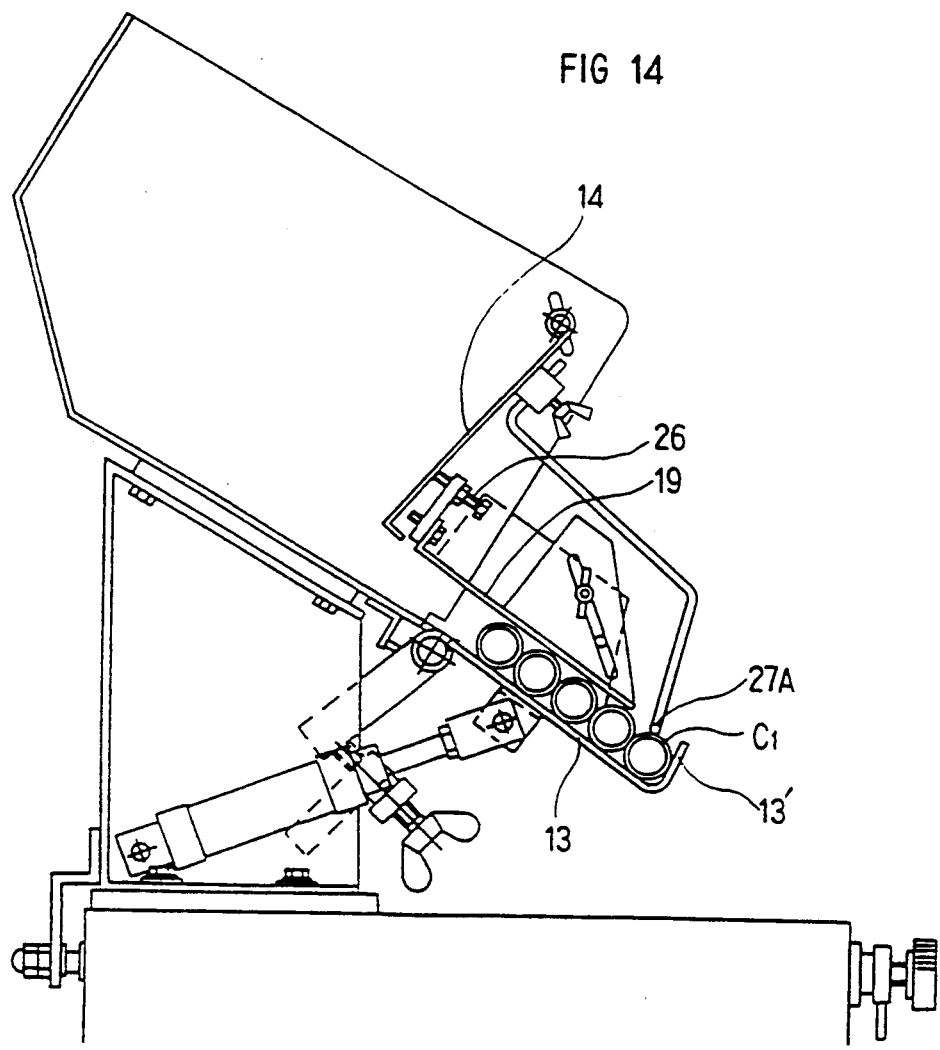

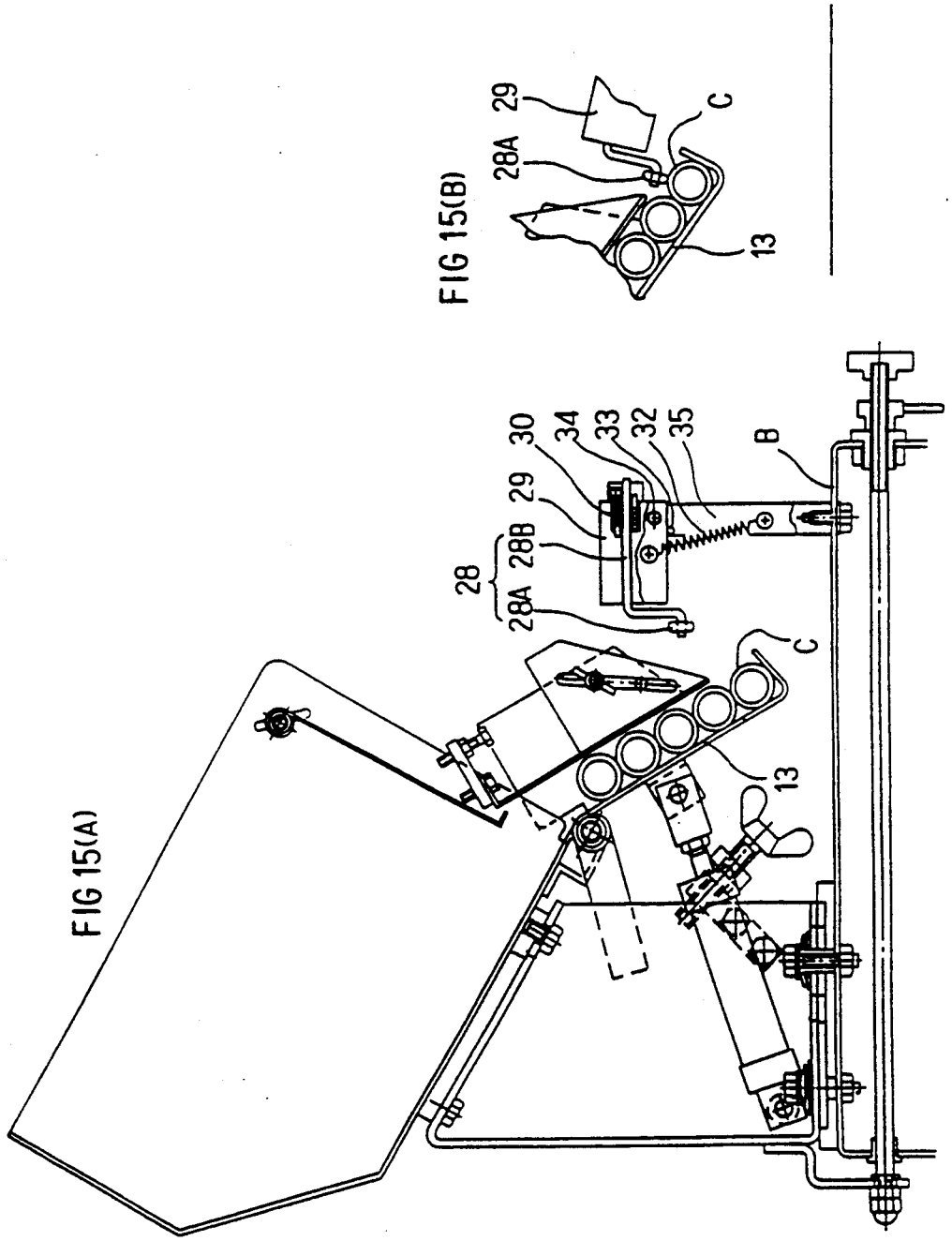

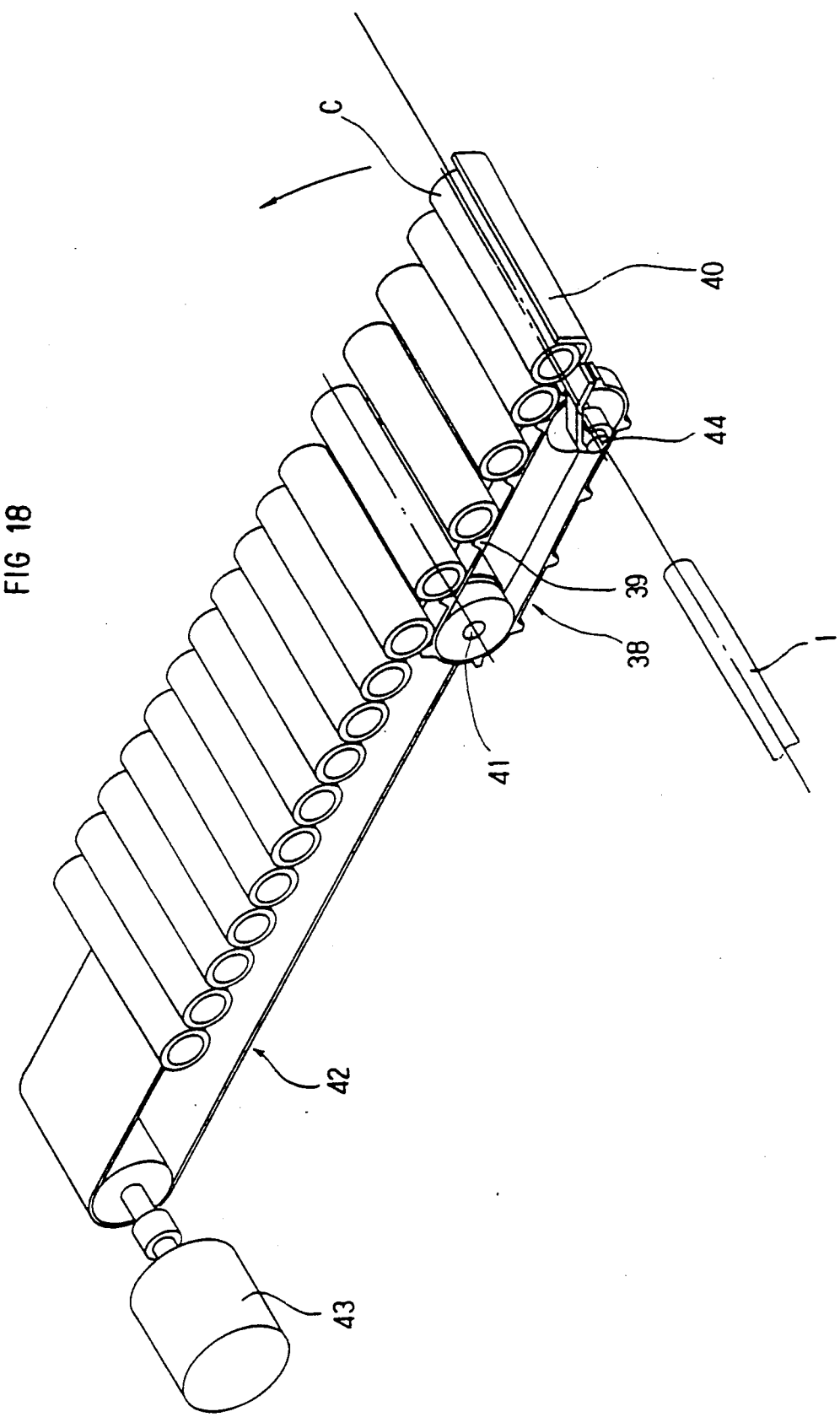

METHOD AND APPARATUS FOR SUPPLYING CASINGS

BACKGROUND OF THE INVENTION

1. Field of the Invention

The present invention is utilized in a technical field for stuffing contents into casings, and more particularly relates to a method and an device for automatically supplying casings to a stuffing device.

2. Description of the Related Art

Casing used for stuffing a meat emulsion or the like have a hollow bar-shaped configuration in which an extremely long cylindrical film is folded with bellows formed in its longitudinal direction.

Conventionally, several types are known as an apparatus for supplying the aforementioned casings.

First, there is a type which is disclosed in Japanese Patent Publication No. 5899/1966 (U.S. Pat. No. 3,191,222). In this apparatus, a clamper, constituted by a pair of V-shaped members opposing the horizontally opposite sides of the casing at its predetermined fitting position, is disposed in such a manner as to be capable of moving horizontally into contact with and away from the casing. Disposed above one of these members is a hopper for accommodating a plurality of casings and causing the casings to be dropped and supplied one at a time to a horizontal receiving surface projecting forwardly at a bottom of a V-shaped groove in the one member through an opening at its bottom. A rotatable lever is disposed forwardly of the one member, and the supplied casing is prevented from falling from the receiving surface of the one member. The movement of the casing to a predetermined position is effected by the aforementioned pair of V-shaped members as they approach each other. At that time, the front edge of the bottom of the one V-shaped member holding the casing advances forwardly while pushing and rotating the lever. In conjunction with this movement, the lever is brought into position outside the range of its movement. Furthermore, a horizontal surface extending rearwardly at the upper portion of the V-shaped member closes the opening of the hopper, and receives an ensuing casing. Thus, when one casing is brought into position, a stuffing tube is inserted into the casing, and the two V-shaped members move away from each other and return to their original positions, and receive the ensuing casing dropped and supplied in the initial state.

As a second example, an apparatus disclosed in Japanese Patent Publication No. 62170/1988 (U.S. Pat. No. 4,434,527) is known. With this known apparatus, there is provided a guide chute for setting a plurality of casings horizontally and arranging them in a vertical direction, a lower end of the guide chute being open. Disposed below the opening is a receiving plate with a space for one casing provided therebetween. There is also provided a pushing member for pushing out a lowermost casing positioned on the receiving plate, in a longitudinal direction of the casing, so as to move the same to a stuffing tube waiting outside. The casing fitted over the stuffing tube is brought to and set in another predetermined position for stuffing. In addition, this apparatus is provided with a conveyor with projections which constitutes a bottom of a hopper, and the plurality of casings are conveyed upwardly by the conveyor with protrusions and are supplied one at a time through an opening provided at an upper portion of the guide chute.

With the above-described known apparatus, however, the following problems are encountered in both cases.

First, with the first known example, at the time when the lowermost one of the plurality of casings stored in the hopper drops from the opening of the hopper onto the clamper, if there are variations in the outside diameter of the casings toward the large-diameter side, there are cases where the casings become jammed in the opening. Furthermore, at the time when the horizontal surface of the upper portion closes the opening at the bottom of the hopper while one of the V-shaped members of the clamper is advancing forwardly after receiving the casing, there are cases where an ensuing casing to which the weight of the multiplicity of casings stacked in the hopper is applied becomes damaged by being clamped by the clamper at the opening should there be variations in the outside diameter of the casings toward the small-diameter side. Thus, with this known apparatus, since the casings are moved and delivered to another location in a nonrestricted state, their movement becomes uncertain. For this reason, problems such as jamming and damaging result. In addition, the arrangement of the apparatus is complicated, and it is difficult to make adjustment for obviating the aforementioned problems.

Next, with the second known example, since the casing supplying apparatus is located in proximity to a forward end of the stuffing tube to which the casing has been supplied, stuffing cannot be effected at this position. In order to effect stuffing, it is necessary to either move the stuffing tube to another position orthogonal to its longitudinal direction or move the supplying apparatus in the same direction so as to remain on standby. This means that the stuffing tube to which the casing has been supplied cannot immediately start stuffing, so that the operating ratio of the stuffing device declines by that margin. Furthermore, a mechanism for moving the stuffing tube is required, so that the apparatus as a whole becomes considerably complicated and expensive. If the supplying apparatus is rotated instead of moving the stuffing tube, a situation can occur in which the arrangement of the casings inside the apparatus becomes disorderly.

In addition, the casing to be supplied to the stuffing tube is located at the lowermost position inside the guide chute, and can be damaged since it is sent out in the longitudinal direction while undergoing friction with the casing located immediately thereabove. Moreover, while the casing is being sent out, an ensuing casing is supported by partially abutting against a portion of the lowermost casing being sent out. However, since a remaining portion of the ensuing casing is subjected to the weight of the other casings from above without being supported, the ensuing casing is sometimes bent at that portion. Furthermore, although the casings are adapted to reach the opening at the lower end of the guide chute by virtue of their own weight, if there are variations in the outside diameter of the casings toward the large-diameter side, there are cases where the casings are jammed inside the guide chute. In order to rectify this problem, if a pressing force is applied to the casings from above, this can further aggravate the problem of the casings becoming damaged or bent at the time when the lowermost casing is sent out toward the stuffing tube. Moreover, this known apparatus requires a conveyer with protrusions, and the apparatus is therefore complicated.

SUMMARY OF THE INVENTION

Accordingly, an object of the present invention is to provide a method and an apparatus for supplying casings which is capable of basically overcoming the above-described drawbacks of the conventional apparatuses and eliminating jammings and the like without causing damage even to soft casings such as collagen casings, thereby positively supplying the casings one by one to a stuffing tube, and in which the structure and operation are simple and adjustment is facilitated.

To this end, with respect to a method for supplying casings according to the present invention, there is provided a method for supplying casings comprising the steps of: placing a plurality of casings in parallel on an arranging surface of a supplying member, the arranging surface being formed in such a manner as to extend from an upstream portion of the supplying member to a downstream portion thereof; preventing a casing to be fitted over a stuffing tube among the plurality of casings placed from moving in a downstream direction; rotating the supplying member about an axis extending at a distance from, and along a longitudinal axis of, the casing to be fitted, up to a position in which the casing to be fitted is aligned with the stuffing tube; inserting the stuffing tube into the casing to be fitted; rotating the supplying member about the axis so as to deliver the casing to the stuffing tube; and moving in a downstream direction the casings that are placed on the arranging surface upstream of the casing delivered to the stuffing tube.

In addition, with respect to an apparatus for supplying casings according to the present invention, there is provided an apparatus for supplying casings to a stuffing device having a stuffing tube for stuffing a content into a casing, the apparatus comprising: a supplying member having an arranging surface for arranging thereon a plurality of casings between an upstream portion and a downstream portion and having a restricting portion for preventing the casing to be fitted over the stuffing tube from moving in a downstream direction; and an axis extending at a distance from, and along a longitudinal direction of, the restricting portion, wherein the supplying member is rotatable about the axis between a position in which the casing located at the restricting portion is aligned with the stuffing tube on the one hand, and another position on the other.

In the present invention having the above-described arrangement, the plurality of casings placed on the arranging surface of the supplying member are arranged in parallel one after another toward the upstream side by using as a reference the casing which is located at the restricting portion and is to be fitted over the stuffing tube.

The supplying member is subjected to rotative drive so that the casing located at the restricting portion reaches a position for alignment with the casing tube. After the casing which has reached the alignment position is fitted over the stuffing tube, the supplying member is subjected to rotative drive to another position. That is, the supplying member moves in an orthogonal direction to the stuffing tube in a state in which the remaining casings, excluding the casing held by the stuffing tube, are arranged thereon as they are. After the casing on the restricting portion has been delivered to the stuffing tube, the casings on the arranging surface each move by a portion of one casing, and an ensuing casing is sent to the restricting portion to be ready for an ensuing supplying operation.

The above and other objects, features and advantages of the present invention will become more apparent from the following detailed description of the invention when read in conjunction with the accompanying drawings.

BRIEF DESCRIPTION OF THE DRAWINGS

FIG. 2 is a cross-sectional view of the supplying apparatus shown in FIG. 1;

FIG. 3 is a view of FIG. 2 taken in the direction of arrow A;

FIG. 4 is a side-elevational view of FIG. 3;

FIG. 7 is a partly cross-sectional view of FIG. 3;

FIG. 8 is a cross-sectional view taken along the line D—D of FIG. 2 with a casing interposed;

FIGS. 9A and 9B to 12A and 12B are diagrams illustrating the operation of the apparatus shown in FIG. 1 in order, in which FIGS. 9A, 10A, 11A, and 12A, are cross-sectional views;

FIGS. 9B, 10B, 11B, and 12B are front elevational views;

FIG. 13 is a cross-sectional view of the apparatus in accordance with a second embodiment;

FIG. 14 is a cross-sectional view of the apparatus shown in FIG. 13 at a second position;

FIG. 15A is a cross-sectional view of the apparatus in accordance with a third embodiment;

FIG. 15B is a partly cross-sectional view of the apparatus shown in FIG. 15A at the second position;

FIG. 18 is a perspective view of the apparatus in accordance with a fifth embodiment.

DESCRIPTION OF THE PREFERRED EMBODIMENTS

Referring now to the accompanying drawings, a description will be given of the embodiments of the present invention.

Figure 1:
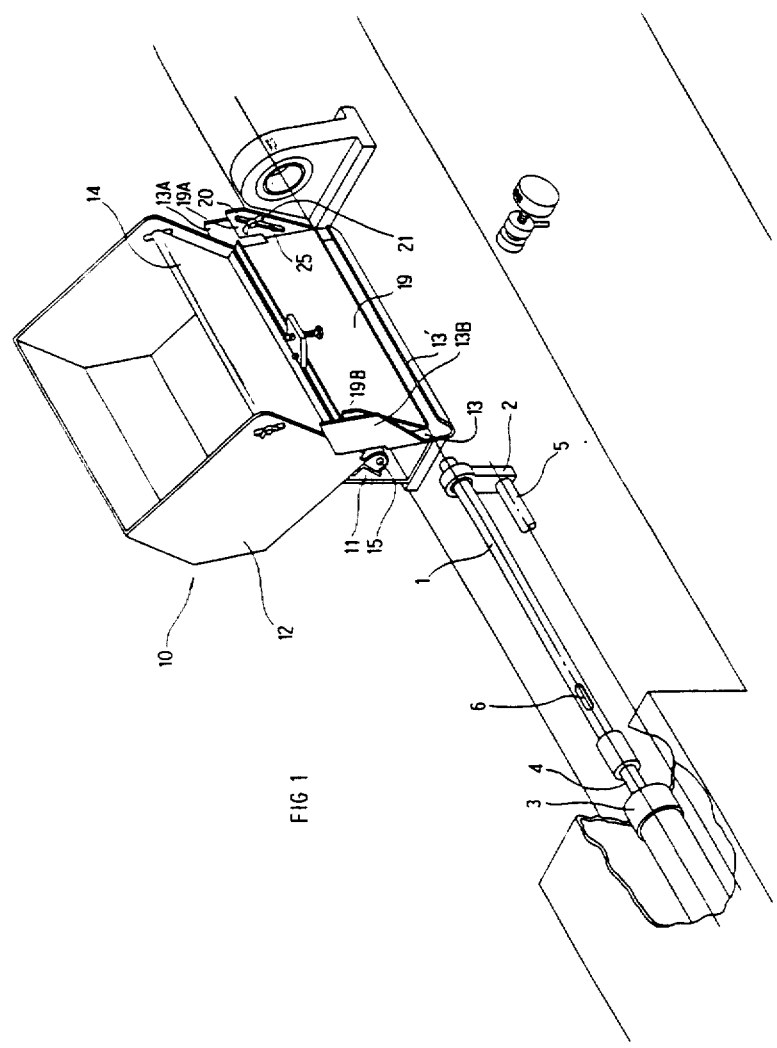
FIG. 1 is a perspective view illustrating a casing supplying apparatus in accordance with a first embodiment of the present invention and its peripheral components.
Figure 11B:
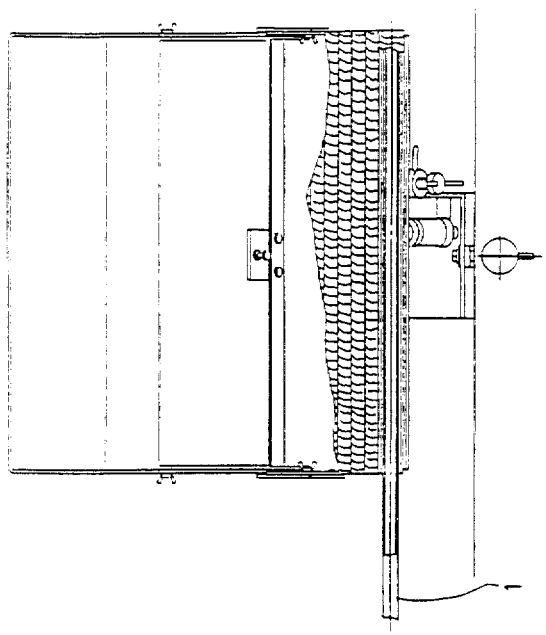
Figure 11A:
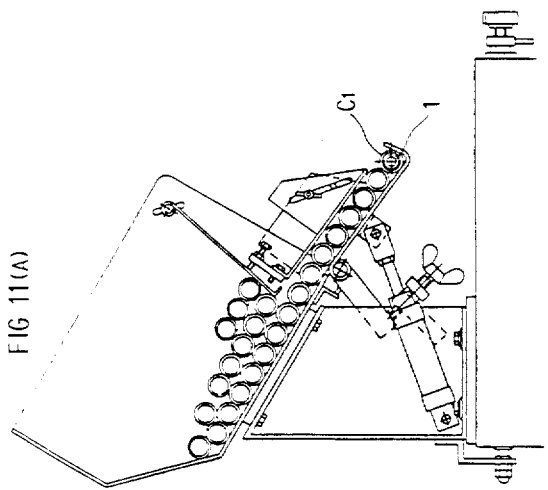

FIG. 1 is a perspective view of a casing supplying apparatus in accordance with a first embodiment of the present invention and its peripheral components, and FIG. 2 is a cross-sectional view of the supplying apparatus shown in FIG. 2.

In FIG. 1, a stuffing tube 1 for stuffing a meat emulsion is connected to a rod 4 of a cylinder 3 and is reciprocatably driven at regular intervals in its longitudinal direction via the rod 4. The stuffing tube 1 is provided with a raw-material introducing hole 6 for stuffing the meat emulsion into a casing via the interior of the stuffing tube, the raw-material introducing hole 6 being communicating with an unillustrated pump. The stuffing tube 1 in FIG. 1 is at a retracted position.

A supplying apparatus 10 is disposed on a side of a forward end of the stuffing tube 1 at the retracted position. The supplying apparatus 10 comprises a hopper 12 supported by a supporting member 11 as well as a flapper 13 serving as a supplying member for supplying a casing to a stuffing position.

The hopper 12 has a box-shaped configuration in which its upper side and stuffing tube side are open, and has a tabular damper member 14 disposed on the stuffing tube side. A bottom of the hopper 12 is inclined downwardly from its upstream portion to its downstream portion toward the flapper 13. The damper member 14 is affixed to the hopper 12 at its upper end in such a manner as to be swingable, and its lower edge is set in such a manner as to form an opening having a slightly larger gap than the diameter of one casing between the same and the bottom of the hopper 12.

A rotating shaft 15 which is parallel with the stuffing tube is provided on the lower side of the bottom of the hopper 12. The flapper 13 is rotatably supported at its upper end by the rotating shaft 15. The flapper 13 constitutes a lower guide member having an arranging surface for arranging the casings in parallel, and its upper end portion is substantially continuous with the bottom of the hopper 12, while a V-shaped restricting portion 13' is formed at its lower end portion for preventing the casings from falling down. The position of the restricting portion 13' is set in such a manner that the casing whose position is restricted at the restricting portion 13' is placed at a second position on the longitudinal axis of the stuffing tube 1 when the flapper 13 placed in the illustrated first position is rotated about the rotating shaft 15.

Figure 5:
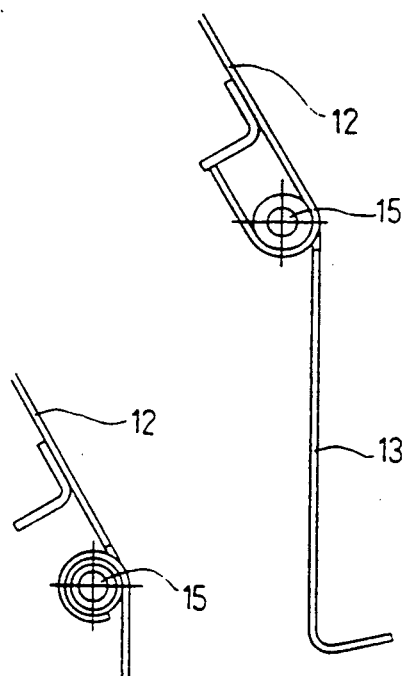
FIG. 5 is a cross-sectional view taken along the line B—B of FIG. 3.
Figure 6:
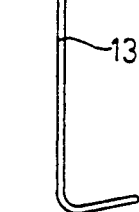
FIG. 6 is a cross-sectional view taken along the line C—C of FIG. 3.

As is apparent from FIG. 2 as well, the rotating shaft 15 is positioned on the lower side of both the bottom of the hopper 12 and the casing arranging surface of the flapper 13. Furthermore, the rotating shaft 15 is positioned on the downstream side (rightward in the drawing) of a swinging center of the damper 14 in the moving direction of the casing (in a direction in which the casing falls down and moves on the bottom of the hopper). As shown in FIGS. 3 and 4, the bottom of the hopper 12 is wound into a cylindrical configuration around opposite end portions of the rotating shaft 15 (see FIG. 5), and an upper edge of the flapper 13 between the aforementioned opposite end portions is similarly wound (see FIG. 6), so that even when the flapper 13 rotates, the bottom of the hopper and the arranging surface of the flapper are always substantially continuous via a surface in the form of a circular arc (see FIGS. 5 and 6).

As shown in FIG. 2, a rod 16A of a cylinder 16 is connected to the flapper 13 arranged as described above, so that the flapper 13 is reciprocatably driven about the rotating shaft 15. In addition, as shown in FIGS. 3 and 7, an arm 17 serving as an aligning member is secured to an upper end of the flapper 13 on a lower side thereof, and is retained by a stopper 18 (see FIG. 10B) provided on the supporting member 11 at the time of rotation, thereby allowing the flapper 13 to stop at its second position. The stopping of the flapper 13 at its first position is effected by a stroke end of the cylinder 16, whereby the flapper 13 reciprocates accurately between the first and second positions. The stopper 18, which constitutes a first adjusting means, has a form of such a screw that permits a change in the position of the restricting portion 13' in order to maintain alignment between the casing and the stuffing tube in the second position when the casing size (diameter) is altered.

In addition, the apparatus of this embodiment has a second adjusting means (see FIG. 2) which is arranged such that the position in which the supporting member 11 is fixed to a base B of the stuffing device can be adjusted by rotating an adjustment knob 23, which, in turn, causes a rod 24 with a screw to which the adjusting knob 23 is attached to move in the direction of its longitudinal axis. At the time of a change in the casing size, the second adjusting means is capable of making the positional adjustment of the restricting portion 13' in cooperation with the first adjusting means. It should be noted that, in order to permit the movement of the supporting member 11 without needing to loosen a fixing screw 11A of the supporting member 11, the supporting member 11 is pressed and secured by means of a disk spring 11B interposed between a head of the fixing screw 11A and the supporting member 11.

Referring to FIGS. 1 and 8, the supplying member in accordance with this embodiment is preferably provided with not only the flapper 13 constituting the lower guide member but also an upper guide member 19 which is disposed thereabove in parallel therewith. An interval between the two guide members 13, 19 is set to be slightly greater than the diameter of a casing C. The upper guide member 19 has a pair of side walls 19A, 19B each having an elongated hole 20 formed therein, and is secured to a pair of side walls 13A, 13B of the lower guide member 13 by tightening nuts 21 respectively meshing with screws 21' affixed to the side walls 13A, 13B through the elongated holes 20. A guide pin 25 for guiding the elongated hole 20 together with the screw 21' is secured to each side wall 13A, 13B, and is fitted in the elongated hole 20, whereby the moving direction of the upper guide member 19 is restricted in the direction of the elongated hole.

A lower edge 19' of the upper guide member 19 is positioned in such a manner that an interval L greater than the diameter of the casing C is formed between the lower edge 19' and the restricting member 13' of the lower guide member 13 (see FIG. 2). The direction of each elongated hole 20 is determined such that the interval between the lower guide member 13 and the upper guide member 19 (see FIG. 8) and the interval L between the restricting portion 13' and the lower edge 19' of the upper guide member 19 (see FIG. 2) can be changed simultaneously if the upper guide member 19 is moved, so as to cope with a change in the diameter of casings. Thus, the elongated holes 20, together with the screws 21' and the guide pins 25, constitute a third adjusting means. In addition, a stopper 22 having a threaded portion is provided at an upper end of the upper guide member 19 so as to restrict a lower limit of swinging movement of the damper 14. Disposed above the stopper 22 is a screw 26 for adjusting an amount of swinging movement of the damper 14 to the upstream side.

The automatic feeding of the casings in the apparatus of this embodiment thus arranged is effected as follows.

Figure 9B:
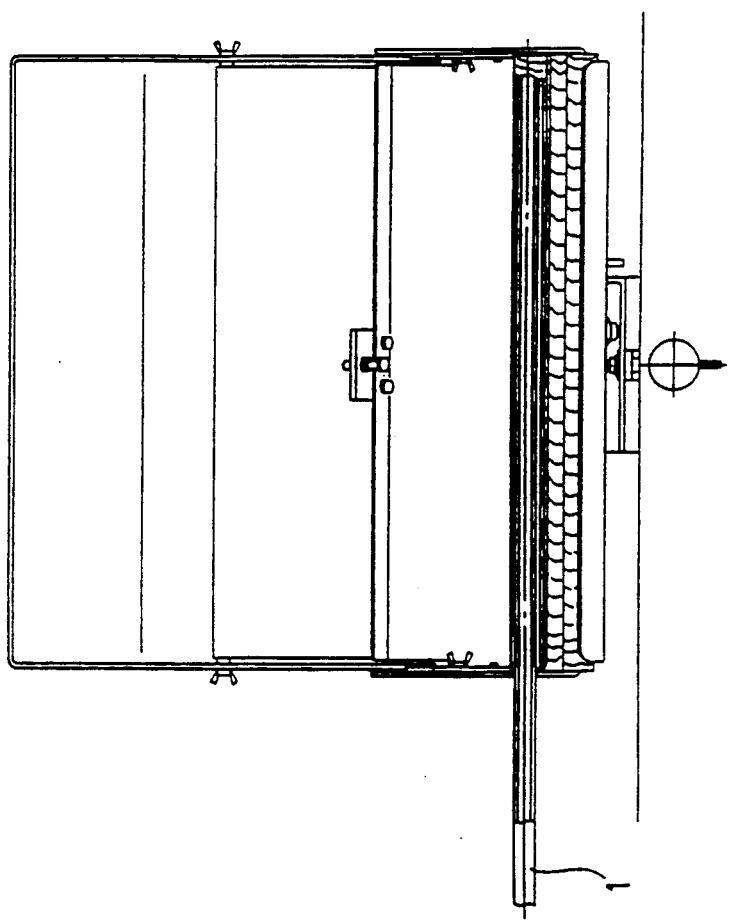
Figure 9A:
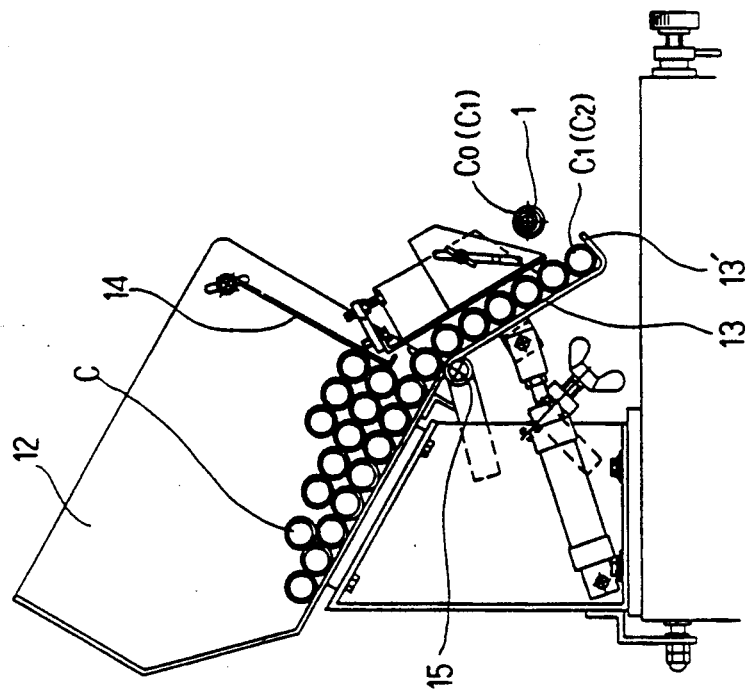

(1) First, if a plurality of casings C are charged into the hopper 12, as shown in FIG. 9A, the casings C slide down onto the arranging surface of the flapper 13 (lower guide member) at the illustrated first position through an opening formed by the bottom of the hopper 12 and the damper 14, and are arranged in parallel. A lowermost casing C1 is retained by the restricting portion 13' and is thereby prevented from rolling down. At this time, the stuffing tube 1 is inserted into a preceding casing C0 already supplied and is in a state in which the contents can be stuffed into the casing C0 (see FIG. 9B).

Figure 10:
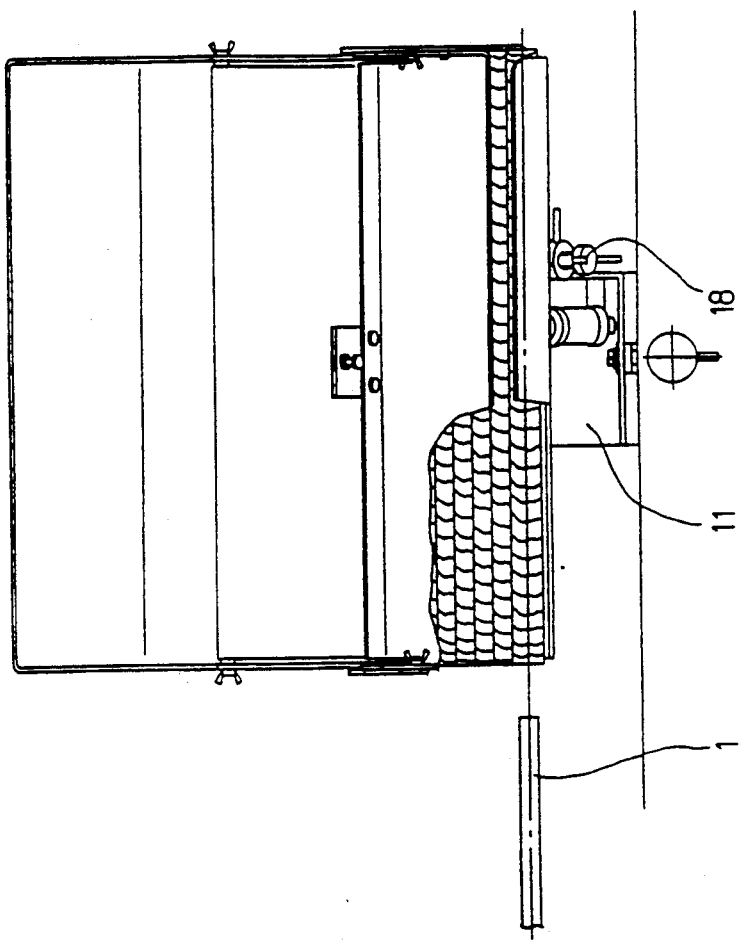
Figure 10:
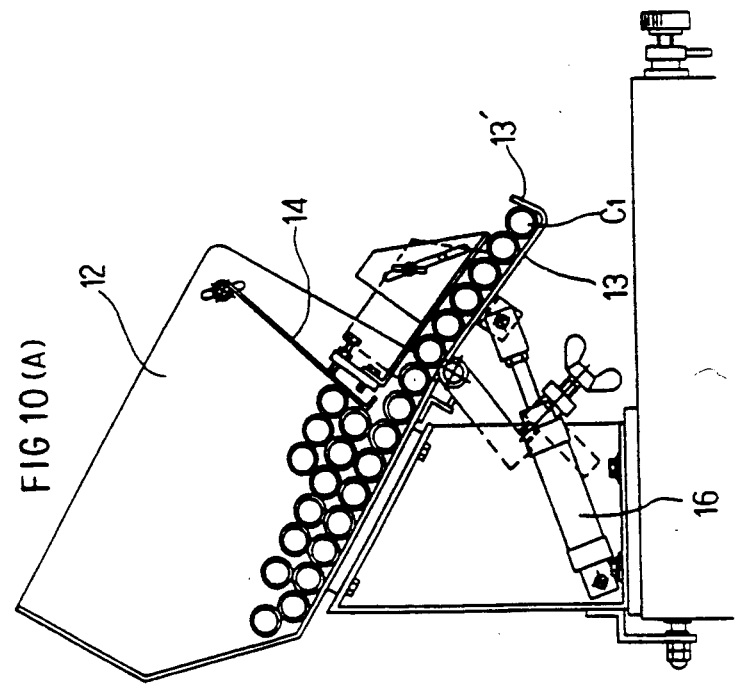

(2) Upon completion of the stuffing into one casing C0, the stuffing tube 1 retracts, as shown in FIGS. 10A and 10B, and the flapper 13 is brought to the second position by being driven by the cylinder 16, so that the casing C1 located at the restricting portion 13' of the flapper 13 is aligned with the axis of the stuffing tube 1.

Figure 11B:
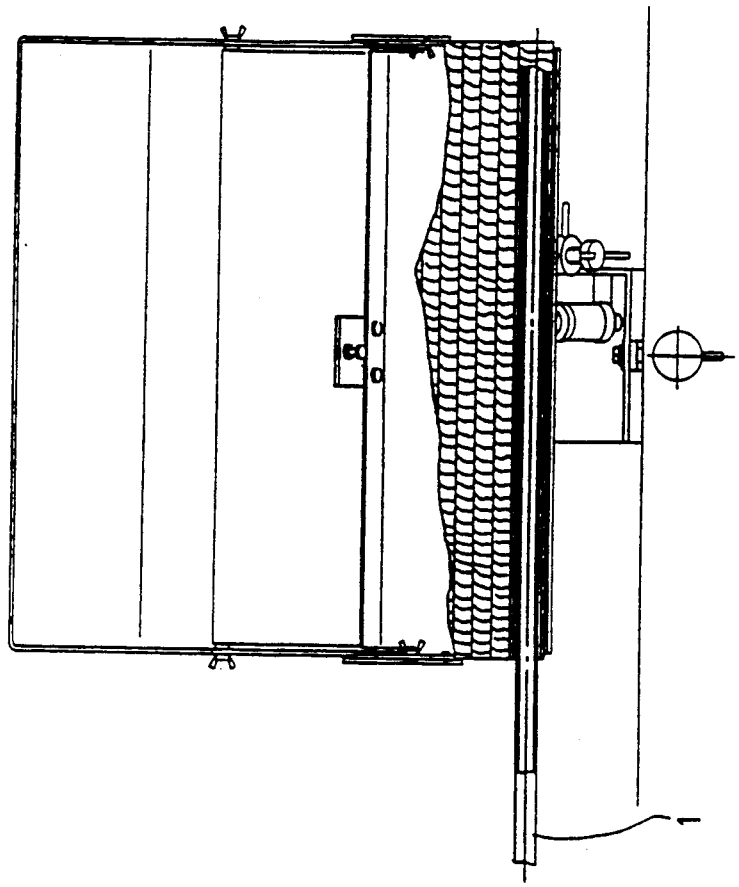
Figure 11A:
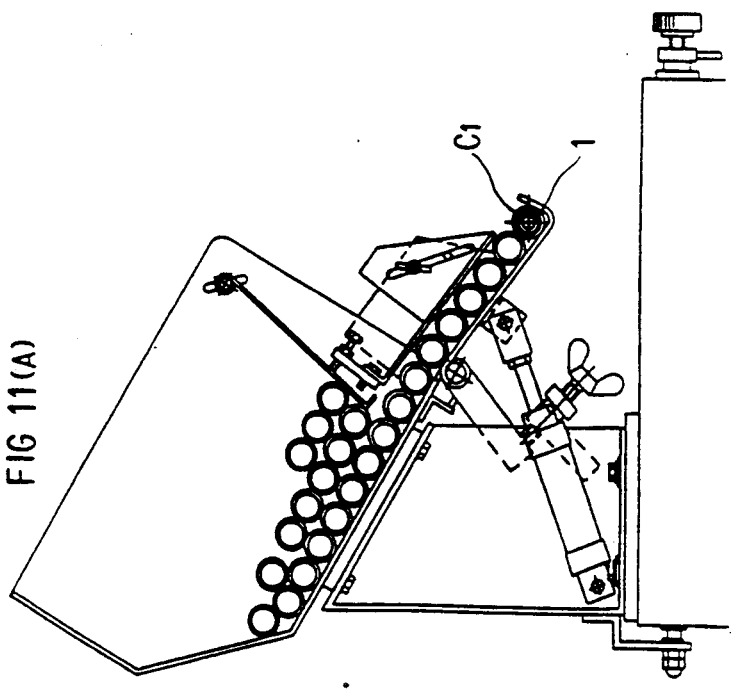

(3) In this state, the stuffing tube 1 is driven forwardly and advances into the casing C1, (see FIGS. 11A and 11B).

Figure 12B:
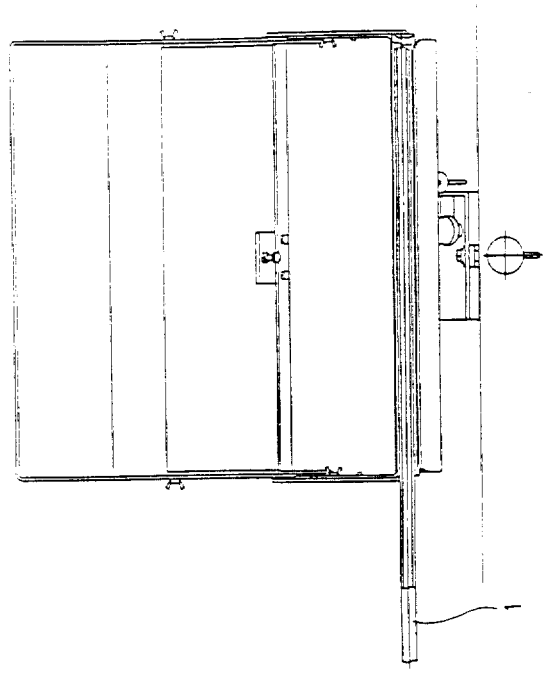
Figure 12A:
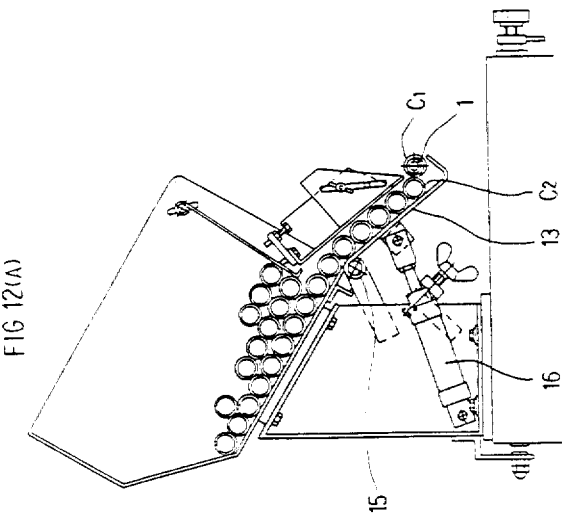

(4) With the stuffing tube 1 thus advanced into the casing C1, the flapper 13 starts to undergo rotative return toward the first position, i.e., an original position (see FIGS. 12A and 12B). Accordingly, as shown in FIGS. 12A and 12B, only the casing C1 remains in the stuffing position in a state in which it is held by the stuffing tube 1, and the delivery of the casing C1 to the stuffing tube 1 is thereby completed. The other casings return to the aforementioned first position together with the flapper 13 (see FIG. 9A). During the aforementioned rotative return, the casing C1 and an ensuing casing C2 are separated from each other normal to their longitudinal direction, so that no longitudinal friction is involved between the two casings. Subsequently, the ensuing casing C2 and the following casings each slide down on the flapper by a portion of one casing, and the casing C2 is set ready for an ensuing supplying operation (see FIG. 9A).

(5) It should be noted that, in the aforementioned step (4), when the flapper 13 rotates about the rotating shaft 15, the casings move quite smoothly from the hopper 12 since the upper end portion of the arranging surface of the flapper 13 is continuous with the bottom of the hopper 12 by virtue of the arcuate surface. In addition, since the arcuate surface extends in the longitudinal direction of the casing, an interval between the casings is created, so that jamming does not occur. Moreover, since the damper 14 pushes the casings in the second and higher rows rearwardly inside the hopper 12 through the rotative operation of the flapper 13 in the aforementioned step (2), the jamming of the casings when moving toward the flapper 13 is prevented more reliably (see FIG. 10A).

Referring now to FIGS. 13 and 14, a description will be given of a second embodiment of the present invention. In this embodiment, the casing C1 is positioned at the restricting portion 13' so that the casing C1 at the restricting portion 13' will not be offset upwardly of the restricting portion 13' when the apparatus of the foregoing embodiment is run at a very high speed.

In this embodiment, the damper 14 is provided with a repressing member 27 bent into a substantially L-shaped configuration and having a distal end portion 27A extending in the longitudinal direction of the casing. The repressing member 27 is arranged such that, when the casing C1 on the flapper 13 is brought into the second position (at the position of an extension of the axis of the stuffing tube), as shown in FIG. 14, the damper 14 is rotated by means of the screw 26 affixed to the upper guide member 19, whereby the repressing member 27 is caused to swing downwardly, and the distal end portion 27A is brought into contact with an upper surface of the casing C1, thereby preventing the casing C1 from being offset from the restricting portion 13'. When the flapper 13 returns to the first position, the damper 14 swings downstream together with the movement of the screw 26, so that the repressing member 27 returns to its upper standby position, as shown in FIG. 13.

Figure 16C:
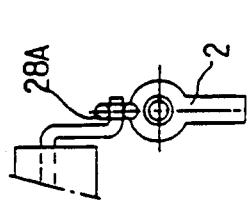
FIG. 16C is a right side view of the apparatus shown in FIG. 16A.
Figure 16B:
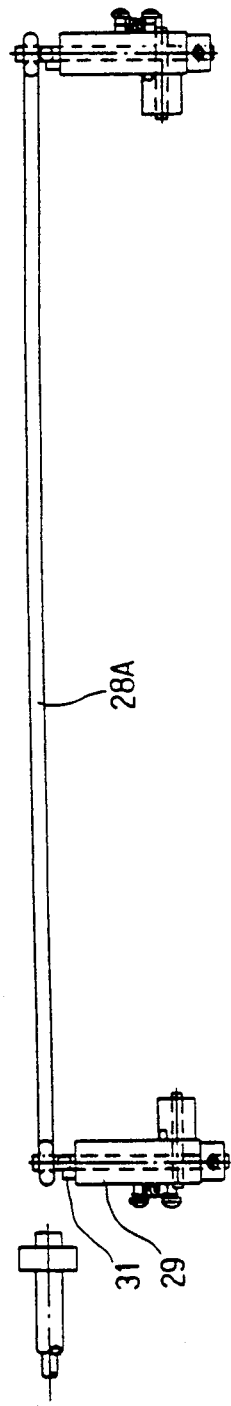
FIG. 16B is a top plan view thereof.
Figure 16A:
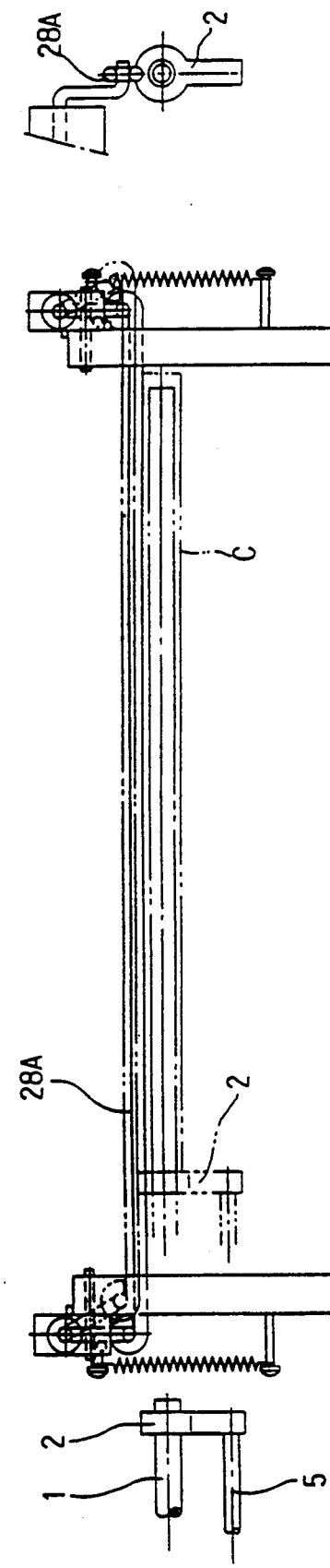
FIG. 16A is a front elevational view illustrating the vicinity of repressing member of the apparatus shown in FIG. 15A.

A description will now be given, of a third embodiment shown in FIGS. 15 and 16. A repressing member 28 is arranged such that its proximal portion 28B is swingably supported by an arm member 29 and is urged clockwise as viewed in FIG. 16A about its axis by means of a torsion spring 30, so that its distal end portion 28A moves in its axial direction by means of the swinging motion and its height can be varied. The arm member 29 is mounted on a column 35 provided uprightly on the base B of the stuffing device, in such a manner as to be rotatable about a shaft 34, and is urged downwardly by means of a spring 32. A stopper 31 for retaining the proximal portion 28B and a stopper 33 for retaining the arm member 29 are provided on the arm member 29 and the column 35, respectively, so that the distal end portion 28A will stop at a predetermined position.

In this embodiment thus arranged, midway in the course when the casing C on the flapper 13 rises toward the second position, the distal end portion 28A of the holding member 28 is brought into contact with the casing C. Subsequently, as the flapper 13 rises, the arm member 29 rotates against the urging force of the spring 32 until the flapper 13 reaches the second position (see FIG. 15B). This embodiment differs from the second embodiment in that the flapper 13 is raised while the casing C is being pressed by the repressing member 28. Even if the diameter of the casing is changed, the arm member is swung by the casing, so that there is no need for positional adjustment of the repressing member 28 in the direction of its height. When the casing C is supported by the stuffing tube 1, and the casing C is pushed forwardly by a pusher 2 affixed to the rod 5 reciprocated by an unillustrated cylinder, the proximal portion 28B of the repressing member 28 is rotated by the pusher 2, as shown in FIG. 16A, and its distal end portion 28A moves upward, canceling its abutment against the casing C and causing the arm member 29 to return to its original position by means of the spring 32. After the casing C has been used for stuffing, the repressing member 28 also returns to its original position by means of the urging force of the torsion spring 30 as the pusher 2 retracts.

Figure 17:
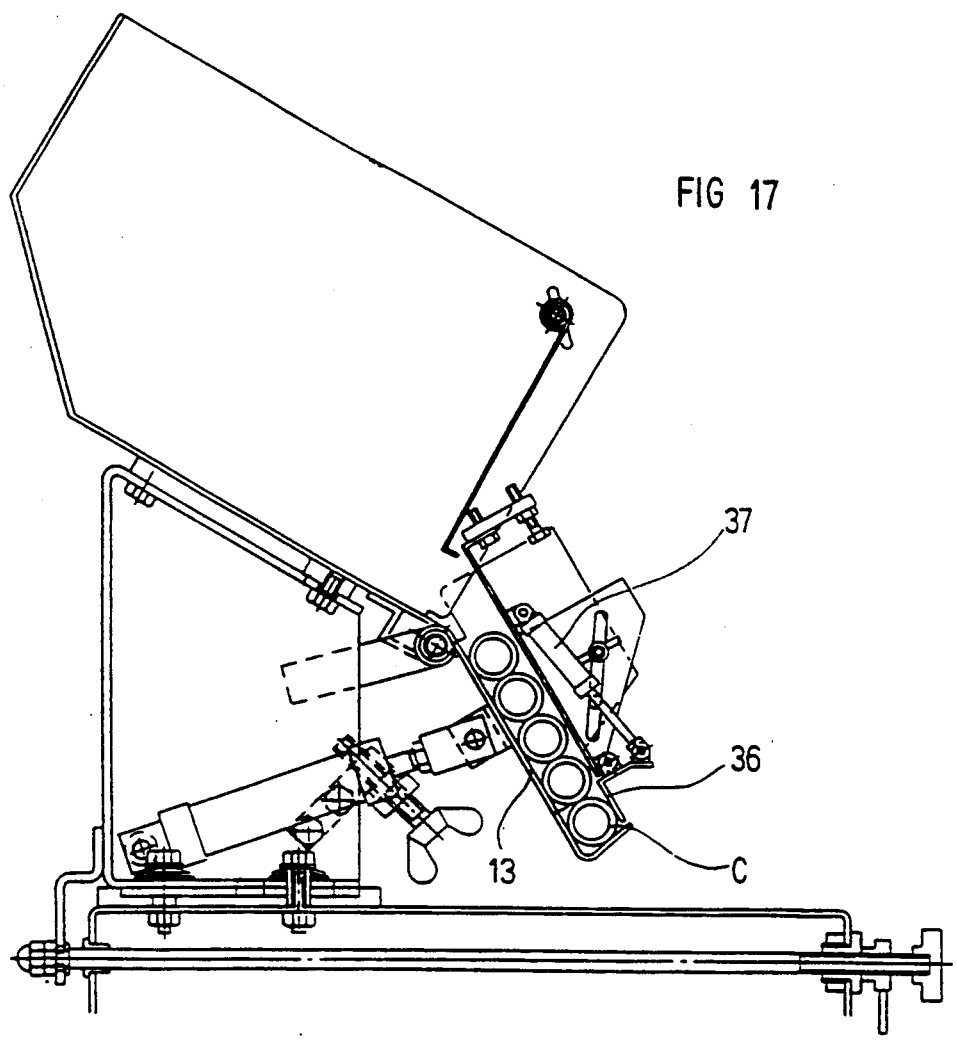
FIG. 17 is a cross-sectional view of the apparatus in accordance with a fourth embodiment.

A description will now be given of a fourth embodiment shown in FIG. 17. In this embodiment, an arrangement is provided such that a repressing member 36 is closed after the flapper 13 reaches the second position until the stuffing tube is inserted into the casing C, while the repressing member 36 is opened by the operation of a cylinder 37 when the flapper returns to the first position. It should be noted that the repressing member 36 and the casing C may not be brought into contact with each other, and there may be a small gap therebetween.

In addition to the advantage of preventing the floating up of the casing, in the restricting portion 13', the holding members in the above-described second, third, and fourth embodiments offer an advantage in that when an exceptionally curved casing is used, its curve shape along its longitudinal direction can be rectified into a straight shape, thereby rendering the alignment between the casing and the stuffing tube more positive.

Furthermore, a fifth embodiment of the present invention is shown in FIG. 18. In this embodiment, a belt conveyor 38, i.e., a supplying member, is disposed in such a manner as to reciprocate between an illustrated second position and a first position obtained as the belt conveyor 38 is rotated upwardly therefrom, as shown by the arrow. The belt conveyor 38 is constituted by a belt 39 with protrusions each accommodating one casing at a time, and an L-shaped restricting portion 40 is provided at a tip of the belt conveyor 38 by being positioned in place by means of an unillustrated spring in such a manner as to be rotatable with a shaft 44 as a fulcrum. The belt conveyor 38 is adapted to rotate about a shaft 41 and the shaft 44 by means of a motor 43 via a belt conveyor 42 which will be described below, so as to convey the casings on the belt 39 to the restricting portion 40. The belt conveyor 42, which is a hopper disposed horizontally, has a multiplicity of casings placed thereon, and is adapted to be driven by the motor 43 which rotates by a portion of one casing during a predetermined period so as to deliver one casing at a time to the belt conveyor 38 serving as a supplying member. After the stuffing tube 1 is inserted into the casing C located at the illustrated second position, the belt conveyor 38 starts to rotate upwardly about the shaft 41, while the restricting portion 40 rotates downwardly about the shaft 44 through cooperation between the stuffing tube 1 and the above-described rotation of the belt conveyor 38. Upon completion of the delivery of the casing C to the stuffing tube 1 by means of the rotation of the restricting portion 40, the belt conveyor 38 conveys an ensuing casing to the restricting portion 40. Even if the belt conveyor 38 is inclined upwardly, the casings can be conveyed positively by means of the belt 39 with protrusions. In accordance with this embodiment, at the time of stuffing, the casings above the belt conveyor 38 are not stained with the stuffing material since the stuffing tube is disposed on the lower side of the belt conveyor 38 located in the first position.

As described above, in accordance with the present invention, the arrangement provided is such that after the insertion of the stuffing tube into one of the casings arranged on the supplying member, the supplying member is moved in such a manner as to move the remaining casings in an orthogonal direction to the longitudinal direction of the stuffing tube away from the stuffing tube which is in a stationary state with the casing fitted over it. Hence, the present invention offers the following advantages.

Since the casings can be delivered to the stuffing tube without mediation of any other member with the casings arranged on the supplying member as they are, the casings experience no jamming or the like, and can be conveyed positively.

Since the supply of the casings to the stuffing tube is effected by simply rotating the supplying member, the arrangement is very simple and the number of parts to be adjusted is small.

The casings are supported over their entire length by the supplying member until they are received by the stuffing tube, with the result that even if soft casings, when used, are not subjected to deformation or damage.

The casing which is in an ensuing position to that of the casing being supplied to the stuffing tube is supported over its entire length by the casing being supplied, and is moved, simultaneously over its entire length, away from the casing being supplied, without entailing friction after the casing being supplied is fitted over the stuffing tube. Hence, deformation such as bending is not caused.

The plurality of casings arranged on the supplying member move not only by their own weight but by receiving a force exerted by the movement of the supplying member, so that the movement of the casings is rendered positive.

Even if a hopper is provided, the casings are capable of moving on the continuous surface toward the supplying member, with the result that the movement of the casings is rendered smooth and positive.

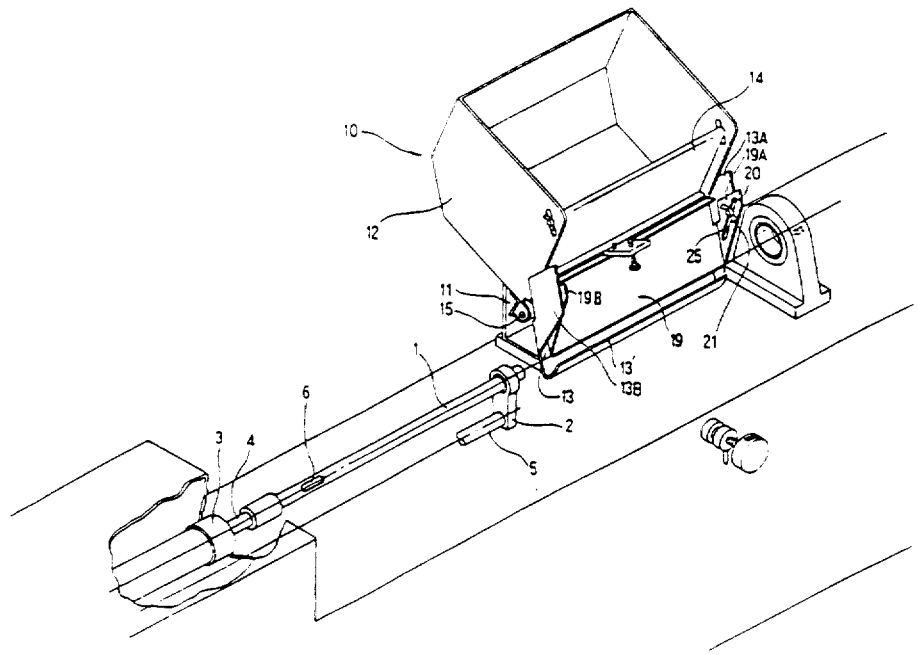

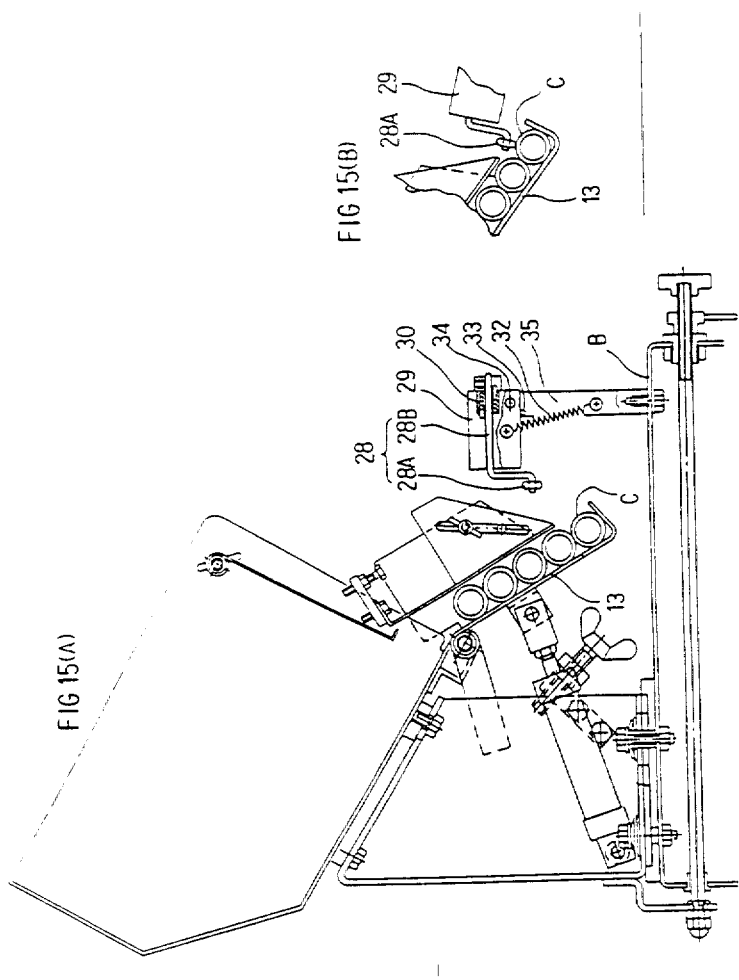

What is claimed is:

1. A method for supplying casings comprising the steps of:

placing a plurality of casings in parallel on an arranging surface of a supplying member, said arranging surface being formed in such a manner as to extend from an upstream portion of said supplying member to a downstream portion thereof;

preventing a casing to be fitted over a stuffing tube among said plurality of casings from moving in a downstream direction by means of a restricting portion provided at a downstream position of said arranging surface and integral with said arranging surface;

rotating said supplying member about an axis disposed at a position upstream of said restricting portion, said axis extending along a longitudinal axis of, and spaced a distance from, said casing to be fitted, the rotation of said supplying member being effected up to a position in which said casing to be fitted is aligned with said stuffing tube;

inserting said stuffing tube into said casing to be fitted;

rotating said supplying member about said axis in a direction in which said supplying member moves away from said stuffing tube, so as to deliver said casing to said stuffing tube;

moving a casing in a downstream direction that is placed on said arranging surface adjacent to said casing to be delivered at the time of rotation of said supplying member in said moving-away direction, until the movement of said adjacent casing is hampered by said restricting portion; and causing said supplying member to wait at a position spaced from said casing delivered to said stuffing tube.

2. An apparatus for supplying casing to a stuffing device having a stuffing tube for stuffing a content into a casing; said apparatus comprising:

a supplying member having an arranging surface for arranging thereon a plurality of casings in parallel between an upstream portion and a downstream portion, said arranging surface having a restricting portion formed integrally therewith and at a downstream position thereof to prevent a casing to be fitted over said stuffing tube from moving in a downstream direction; and a supporting member for supporting said supplying member, said supporting member having an axis disposed at a position upstream of said restricting portion, said axis extending along a longitudinal axis of, and spaced a distance from, said restricting portion, wherein said supplying member is rotatable about said axis between a position in which said casing to be fitted which is located at said restricting portion is aligned with said stuffing tube and another position, said supplying member being disposed in such a manner as to be rotatable toward said another position relative to said casing to be fitted in which said stuffing tube is inserted.

3. A casing supplying apparatus according to claim 2, further comprising a hopper having a guide surface for placing thereon said plurality of casings between an upstream portion and a downstream portion and for moving said casings in a lateral direction thereof, said supplying member being disposed downstream of said guide surface of said hopper in such a manner as to be rotatable relative to said guide surface.

4. A casing supplying apparatus according to claim 3, wherein said axis is located on he lower side of a downstream end portion of said guide surface of said hopper and on the lower side of an upstream end portion of said arranging surface of said supplying member.

5. A casing supplying apparatus according to claim 3 or 4, wherein said guide surface of said hopper is inclined downwardly in a moving direction of said casings.

6. A casing supplying apparatus according to claim 2, wherein said restricting portion is a V-shaped portion formed at a downstream end portion of said supplying member.

7. A casing supplying apparatus according to claim 2 or 3, wherein said supplying member is constituted by a pair of upper and lower guide members for guiding said casings in parallel, an opening portion for taking out one of said casings being formed at a downstream end portion of said upper guide member and having a width corresponding to a diameter of said casings.

8. A casing supplying apparatus according to claim 7, wherein said supporting member is a shaft which is disposed in a downstream end portion of a bottom of said hopper and rotatably supports an upstream end portion of said lower guide member of said supplying member.

9. A casing supplying apparatus according to claim 4, wherein an upstream end portion of said supplying member has a portion of a surface in a form of a circular arc with said axis as a center, thereby forming a surface which is substantially continuous with a bottom of said hopper.

10. A casing supplying apparatus according to claim 2, 3, 4 or 6, wherein said supplying member has an aligning member for abutting against a stopper so that said casing on said restricting portion will be aligned with said stuffing tube when said supplying member is rotated.

11. A casing supplying apparatus according to claim 7, wherein said lower guide member has a pair of side walls at opposite side portions thereof in a direction of said axis, each opposite side portion of said upper guide member being affixed to a surface of each of said side walls.

12. A casing supplying apparatus according to claim 7 wherein said opening portion is defined by said restricting portion disposed in said lower guide member and a downstream end of said upper guide member arranged at an interval therewith.

13. A casing supplying apparatus according to claim 12, wherein said supplying member has a third adjusting means for simultaneously changing an interval between said upper guide member and said lower guide member facing each other and the width of said opening portion.

14. A casing supplying apparatus according to claim 3, further comprising a damper member disposed above a downstream end portion of said guide surface of said hopper in such a manner as to be swingable about a shaft along said axis, a lower end of said damper member forming an opening portion together with said guide surface of said hopper, and said damper member being adapted to swing from said opening portion toward an upstream portion of said hopper through the rotating motion of said supplying member.

15. A casing supplying apparatus according to claim 14, wherein said shaft for swingably supporting said damper member is located more on the upstream side of said hopper than said axis of said supplying member.

16. A casing supplying apparatus according to claim 14 or 15, wherein said damper member is brought into contact with an upstream end portion of said guide member.

17. A casing supplying apparatus according to claim 2, wherein said supplying member has a second adjusting means for rendering variable a distance between a supporting member for supporting a hopper provided rotatably and a position of a longitudinal axis of said stuffing tube.

18. A casing supplying apparatus according to claim 10, wherein said stopper has a first adjusting means for rendering variable a distance between said stopper and said aligning member.

19. A casing supplying apparatus according to claim 2, wherein said supplying member has a repressing member adapted to abut from above against said casing on said restricting portion aligned with said stuffing tube.

20. A casing supplying apparatus according to claim 5, wherein said supplying member has an aligning member for abutting against a stopper so that said casing on said restricting portion will be aligned with said stuffing tube when said supplying member is rotated.

21. A casing supplying apparatus according to claim 7, wherein said supplying member has an aligning member for abutting against a stopper so that said casing on said restricting portion will be aligned with said stuffing tube when said supplying member is rotated.

22. A casing supplying apparatus according to claim 20, wherein said stopper has a first adjusting means for rendering variable a distance between said stopper and said aligning member.

23. A casing supplying apparatus according to claim 21, wherein said stopper has a first adjusting means for rendering variable a distance between said stopper and said aligning member.

* * * * *

UNITED STATES PATENT AND TRADEMARK OFFICE
CERTIFICATE OF CORRECTION

PATENT NO. : 5,092,814
DATED : March 3, 1992
INVENTOR(S) : Minoru Kasai et al

It is certified that error appears in the above-indentified patent and that said Letters Patent is hereby corrected as shown below:

The title page, should be deleted to be replaced with the attached title page.

The drawing sheets, consisting of Figs. 1, 11A, 12A and 15A, should be deleted to be replaced with the drawing sheets, consisting of Figs. 1, 11A, 12A and 15A, as shown on the attached pages.

UNITED STATES PATENT AND TRADEMARK OFFICE
CERTIFICATE OF CORRECTION

PATENT NO. : 5,092,814
DATED : March 3, 1992
INVENTOR(S) : Minoru Kasai et al

It is certified that error appears in the above-indentified patent and that said Letters Patent is hereby corrected as shown below:

Title page, item [73] Assignee:, delete "Hitec Co., Ltd." and insert -- HITEC Co., Ltd. --

Column 1, line 10, delete "device" and insert -- apparatus --.

Column 1, line 13, delete "Casing" and insert -- Casings --.

Column 4, line 43, before "repressing member" insert -- a --.

Column 8, line 62, delete "the casing, in" and insert -- the casing in --.

Column 11, line 14, delete "he" and insert -- the --.

Column 11, line 58, delete "7 wherein" and insert -- 7, wherein --.

Signed and Sealed this

Fifth Day of October, 1993

*Attest:*

BRUCE LEHMAN

*Attesting Officer*  Commissioner of Patents and Trademarks

United States Patent [19]

Kasai et al.

[11] Patent Number: 5,092,814
[45] Date of Patent: Mar. 3, 1992

[54] METHOD AND APPARATUS FOR SUPPLYING CASINGS

[75] Inventors: Minoru Kasai, Ebina; Minoru Nakamura, Tokyo, both of Japan

[73] Assignee: Hitec Co., Ltd., Tokyo, Japan

[21] Appl. No.: 503,846

[22] Filed: Apr. 3, 1990

[30] Foreign Application Priority Data

Apr. 5, 1989 [JP] Japan ................... 1-84646

[51] Int. Cl.⁵ .................................. A22C 11/00
[52] U.S. Cl. ............................. 452/47; 452/32; 452/35; 53/250
[58] Field of Search ........... 17/33, 34, 35, 41, 49; 53/249, 250, 258, 572

[56] References Cited

U.S. PATENT DOCUMENTS

| | | | |
|---|---|---|---|
| 3,191,222 | 6/1965 | Townsend | 17/33 |
| 3,195,176 | 7/1965 | Washburn | 17/49 |
| 3,229,444 | 1/1966 | Rouse | 53/249 |
| 3,672,001 | 6/1972 | Greider | 17/33 |
| 4,434,527 | 3/1984 | Staudenrausch et al. | 17/33 |
| 4,489,460 | 12/1984 | Nausedas | 17/49 |
| 4,545,091 | 10/1985 | Nausedas et al. | 17/33 |
| 4,583,264 | 4/1986 | Nausedas | 17/1 F |
| 4,593,433 | 6/1986 | Nausedas | 17/49 |
| 4,649,607 | 3/1987 | Rollross | 17/33 |

OTHER PUBLICATIONS

Prevention Method . . . vol. 12, No. 142 (M-692) Apr. 30, 1988.
Continuous Casting . . . vol. 9, No. 5 (C-260) Jan. 10, 1985.
Continuous Production . . . vol. 10, No. 105 (M-471) Apr. 9, 1986.

Primary Examiner—Frederick R. Schmidt
Assistant Examiner—Lawrence Cruz
Attorney, Agent, or Firm—Wegner, Cantor, Mueller, & Player

[57] ABSTRACT

Disclosed are a method and an apparatus for supplying casings to a stuffing device having a stuffing tube for stuffing a content into a casing. The apparatus includes a supplying member having an arranging surface for arranging thereon a plurality of casings between an upstream portion and a downstream portion and having a restricting portion for preventing the casing to be fitted over the stuffing tube from moving in a downstream direction; and an axis extending at a distance from, and along a longitudinal direction of, the restricting portion. The supplying member is rotatable about the axis between a position in which the casing located at the restricting portion is aligned with the stuffing tube on the one hand, and another position on the other.

23 Claims, 14 Drawing Sheets